United States Patent
Decrop et al.

(10) Patent No.: US 12,095,865 B2
(45) Date of Patent: Sep. 17, 2024

(54) IDENTIFYING A VOICE COMMAND BOUNDARY

(71) Applicant: International Business Machines Corporation, Armonk, NY (US)

(72) Inventors: Clement Decrop, Arlington, VA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 17/118,701

(22) Filed: Dec. 11, 2020

(65) Prior Publication Data

US 2022/0191305 A1 Jun. 16, 2022

(51) Int. Cl.

| | |
|---|---|
| *H04L 29/06* | (2006.01) |
| *G02B 27/01* | (2006.01) |
| *G06T 19/00* | (2011.01) |
| *H04L 67/131* | (2022.01) |
| *H04W 4/021* | (2018.01) |
| *H04W 4/10* | (2009.01) |

(52) U.S. Cl.
CPC .......... *H04L 67/131* (2022.05); *G02B 27/017* (2013.01); *G06T 19/006* (2013.01); *H04W 4/022* (2013.01); *H04W 4/10* (2013.01)

(58) Field of Classification Search
CPC ..... H04W 4/022; G06T 19/006; G02B 27/017
USPC ........................................................ 370/259
See application file for complete search history.

(56) References Cited

U.S. PATENT DOCUMENTS

| | | | |
|---|---|---|---|
| 7,430,179 B2 * | 9/2008 | Towns-von Stauber | ..................... H04L 1/20 370/252 |
| 9,092,674 B2 | 7/2015 | Andrade et al. | |
| 9,836,652 B2 | 12/2017 | Lection et al. | |
| 10,026,190 B2 | 7/2018 | Bostick et al. | |
| 10,091,554 B1 * | 10/2018 | Newell | .............. H04N 21/4532 |
| 10,111,013 B2 | 10/2018 | Hu | |

(Continued)

FOREIGN PATENT DOCUMENTS

| | | |
|---|---|---|
| CN | 103472909 B | 4/2017 |
| CN | 114627857 A | 6/2022 |

(Continued)

OTHER PUBLICATIONS

Combined Search and Examination Report dated Aug. 1, 2022 from GB Application No. GB2117003.0 filed Nov. 25, 2021.

(Continued)

*Primary Examiner* — Christopher M Crutchfield
*Assistant Examiner* — Jean F Voltaire
(74) *Attorney, Agent, or Firm* — Daniel M. Yeates

(57) ABSTRACT

A method for augmenting communication, a computer program product for augmenting communication, and an augmented reality system. The method for augmenting communication may comprise calculating a sound boundary within which a communication can be heard, generating a visualization of the sound boundary on an augmented reality device, and presenting the visualization on the augmented reality device. The sound boundary may represent a predicted maximum distance at which the communication can be understood.

20 Claims, 9 Drawing Sheets

(56) References Cited

U.S. PATENT DOCUMENTS

| | | | |
|---|---|---|---|
| 2014/0081634 A1 | 3/2014 | Forutanpour | |
| 2014/0136981 A1* | 5/2014 | Xiang | H04S 7/40 |
| | | | 715/728 |
| 2016/0077794 A1* | 3/2016 | Kim | G10L 15/20 |
| | | | 704/275 |
| 2017/0103440 A1 | 4/2017 | Xing et al. | |
| 2017/0213473 A1* | 7/2017 | Ribeira | G09B 5/10 |
| 2018/0184225 A1* | 6/2018 | Zhang | H04S 7/303 |
| 2018/0260187 A1* | 9/2018 | Yasuda | H04M 11/06 |
| 2018/0288518 A1* | 10/2018 | Schmidt | H04R 1/1008 |
| 2018/0315426 A1 | 11/2018 | Oh | |
| 2019/0068529 A1 | 2/2019 | Mullins | |
| 2020/0272699 A1* | 8/2020 | Sridhara | G06F 40/40 |
| 2022/0139042 A1* | 5/2022 | Whitman | G06F 3/011 |
| | | | 345/419 |

FOREIGN PATENT DOCUMENTS

| | | |
|---|---|---|
| DE | 102021129310 A1 | 6/2022 |
| GB | 2606044 A | 10/2022 |
| JP | 2022093303 A | 6/2022 |
| KR | 20150107781 A | 9/2015 |

OTHER PUBLICATIONS

Yasumoto et al., "Ravitas: Realistic Voice Chat Framework for Cooperative Virtual Spaces", IEEE International Conference on Multimedia and Expo, 2005, pp. 1046-1049.

"Augmented Reality and Virtual Reality (AR & VR) Market Size is Expected to Reach USD 571.42 Billion by 2025 | Valuates Reports", Cision PR Newswire, 9 pages, Feb. 13, 2020, downloaded from: https://www.prnewswire.com/in/news-releases/augmented-reality-and-virtual-reality-ar-amp-vr-market-size-is-expected-to-reach-usd-571-42-billion-by-2025-valuates-reports-800630665.html.

"AR/VR meets enterprise", IBM Design Language, 3 pages, downloaded on Nov. 23, 2020 from: https://www.ibm.com/design/v1/language/experience/vrar/.

"Best AR Devices for 2020", PaleBlue Corporate, 10 pages, Feb. 3, 2020, downloaded from: https://pale.blue/2020/02/03/best-ar-devices-for-2020/.

"The Weather Channel", An IBM Business, 3 pages, downloaded Nov. 23, 2020 from: https://weather.com/.

"Is your business braced to withstand weather-related disruptions?", IBM, The Weather Company, downloaded Nov. 23, 2020 at: https://www.ibm.com/weather/industries.

Mikell, M., "New 'reality' of the connected worker: AR with Maximo", Oct. 4, 2017, found at: https://www.ibm.com/blogs/internet-of-things/connected-worker-ar-with-maximo/.

"ARKit Visualizes What Sound Looks Like In Space", Augmented Reality, 3 pages, https://www.facebook.com/augmentedreality/videos/10159369418140341/.

Authors et. al., Disclosed Anonymously, Method and system for recalling complete or partial voice command submitted to AI voice assistance system, IP.com No. IPCOM000261525D, 5 pages, Mar. 12, 2020.

Authors et. al., Disclosed Anonymously, Method to Initiate Communication from a Distance using Visual Tagging, IP.com No. IPCOM000247836D, 6 pages, Oct. 6, 2016.

Ruiwei Shen Tsutomu Terada Masahiko Tsukamoto, (2013), "A system for visualizing sound source using augmented reality", International Journal of Pervasive Computing and Communications, vol. 9 Iss 3 pp. 227-242.

Mell, P. et al., "The NIST Definition of Cloud Computing", Recommendations of the National Institute of Standards and Technology, NIST Special Publication 800-145, 7 pages, Sep. 2011.

* cited by examiner

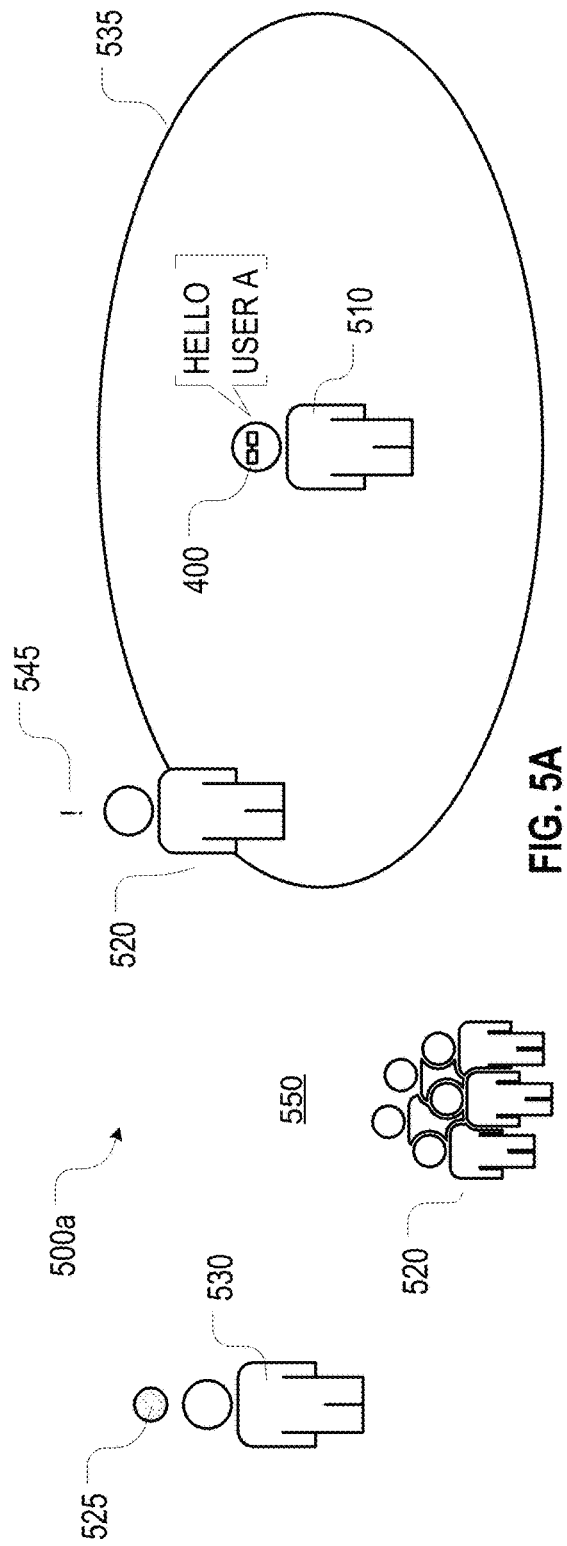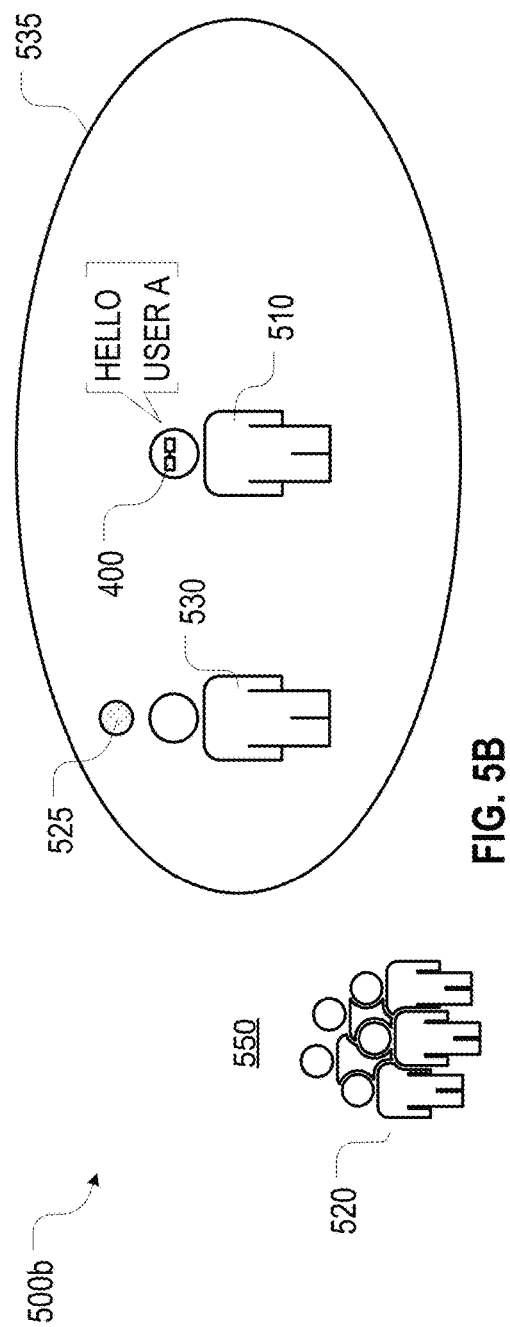

IDENTIFYING A VOICE COMMAND BOUNDARY

BACKGROUND

The present disclosure relates to augmented reality systems; and more specifically, to identifying a voice command boundary by an augmented reality system.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of these new capabilities is augmented reality ("AR"). AR generally refers a technology that adds to or otherwise enhances a real-world environment with computer-generated material (e.g., text or graphics overlaying a visual presentation). The AR presentation may be direct, such as a user looking through a transparent screen with the computer-generated material superimposed on the screen. The AR presentation may also be indirect, such as a presentation of a sporting event with computer-generated graphics highlighting key action, time and score information, etc. superimposed over the game action.

AR presentations are not necessarily viewed by users at the same time the visual images are captured, nor are AR presentations necessarily viewed in real time. For example, an AR presentation may be in the form of a snapshot showing a single instant of time, but this snapshot may be reviewed for a relatively long period of time by a user.

SUMMARY

According to embodiments of the present disclosure, a method for augmenting communication. One embodiment may comprise calculating a sound boundary within which a communication can be heard, generating a visualization of the sound boundary on an augmented reality device, and presenting the visualization on the augmented reality device. In some embodiments, the sound boundary may represent a predicted maximum distance at which the communication can be understood.

According to embodiments of the present disclosure, a computer program product for augmenting communication, the computer program product comprising a computer readable storage medium having program instructions embodied therewith. The program instructions may be executable by a processor to cause the processor to calculate a first sound boundary that represents a predicted maximum distance at which a communication can be understood, calculate a second sound boundary that represents a predicted maximum distance at which the communication can be heard, and predict an intended recipient from among a plurality of people in a location. The prediction may include determining a direction of the communication, and analyzing content of the communication. The program instructions may additionally cause the processor to determine that the intended recipient cannot understand the communication based on the first sound boundary and a location of the intended recipient, and in response superimpose a graphical indication over a view of a locale from a perspective of a user indicating that the intended recipient cannot understand the communication, and automatically electronically transmitting the communication to the intended recipient. The program instructions may additionally cause the processor to determine that an unintended recipient may be able to hear the communication based on the second sound boundary and a location of the unintended recipient, and in response, superimposing a graphical indication over a view of the locale from a perspective of a user indicating that the unintended recipient can hear the communication. Calculating the first sound boundary and the second sound boundary may comprise measuring a volume level of the communication, measuring a level of ambient noise in the locale, and calculating a sound attenuation rate based on one or more environmental factors at the locale.

According to embodiments of the present disclosure, an augmented reality system. One embodiment may comprise a wearable frame, a processor coupled to the wearable frame, and a display coupled to the wearable frame. The processor may calculate a sound boundary within which a communication can be heard. The display may overlay a visualization of the sound boundary onto a field of view of a user. The sound boundary may represent a predicted maximum distance at which the communication can be understood, and the processor may determine that an intended recipient cannot understand the communication based on the sound boundary and a location of the intended recipient.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 5A and 5B are diagrams of the AR system in operation, consistent with some embodiments of the disclosure

Figure 1:
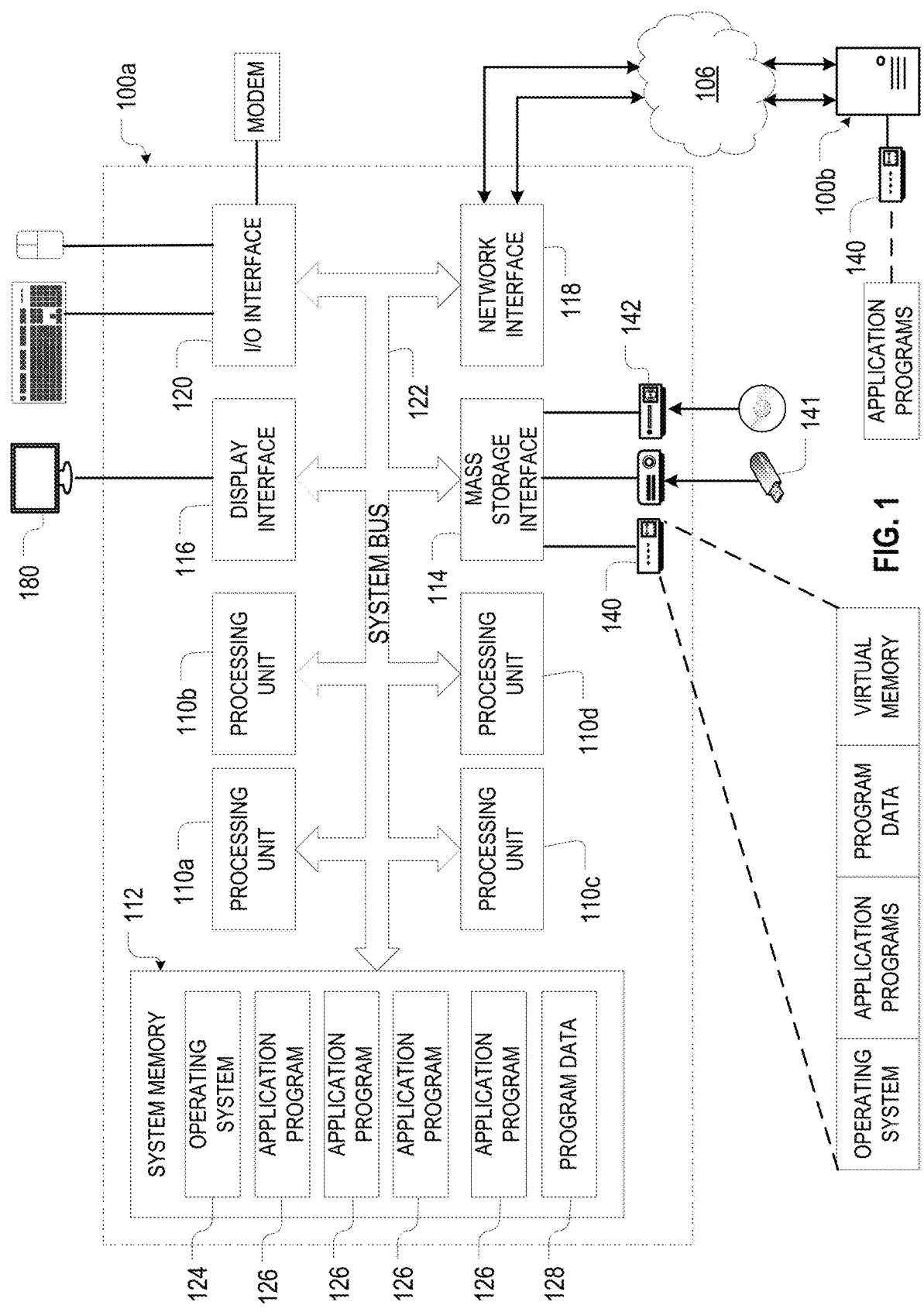
FIG. 1 illustrates an embodiment of a data processing system (DPS), consistent with some embodiments.

While the invention is amenable to various modifications and alternative forms, specifics thereof have been shown by way of example in the drawings and may be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to augmented reality systems; more particular aspects relate to identifying a voice command boundary by an augmented reality system. While the present disclosure is not necessarily limited to such applications, various aspects of the disclosure may be appreciated through a discussion of various examples using this context.

Some embodiments of this disclosure may include a head mounted AR system that allows the user to visualize their actual physical surroundings. Digital augmentations may be projected directly onto the user's retina, such that computer generated material may be presented with and over those actual physical surroundings. Additionally or alternatively, the digital augmentations may be presented on a screen in some embodiments, such as a heads-up display affixed in front of the user, a virtual reality headset, on the user's mobile device, etc.

In some applications of the disclosure, a primary user may be located in a crowed and/or noisy environment. Properly modulating the loudness of a communication and/or spoken commands may be of import to ensure that the intended recipients (e.g., people, devices) can clearly hear the spoken words. At the same time, the primary user's voice can disturb others sharing the same space and/or be overheard by people to whom that communication was not intended. For example, a person may be talking to a nearby person in a library, but others in that same space can easily hear and be distracted by the conversation. As another example, the primary user may be in a loud environment, such as on a train or in manufacturing work site, where speaking at normal volume may not be sufficient for others to hear and understand the primary user.

More generally, when talking to other people in a shared space, it is often difficult to properly calibrate the loudness of one's voice sufficient so that only the intended recipients can hear and/or understand the one's spoken words, particularly in circumstances where it is physically or socially difficult for the one to speak in a louder voice. Accordingly, some embodiments of the disclosure include a method and system that may help primary users of an AR device understand if the intended recipient(s) can hear their voice. Some embodiments of the disclosure may also help the primary user(s) of the AR device understand if other people sharing the same space will be disturbed by their conversation.

Some embodiments may calculate a sound attenuation rate, and then use the sound attention rate to predict who can hear the primary user's voice and/or who will be disturbed by the primary user's voice. In some embodiments, the calculated attenuation rate may be location-specific. In these embodiments, the system may detect, and/or receive from an external sensor, one or more environmental parameters, such as humidity, temperature, wind flow direction, etc. In some embodiments, the predictions may be also be based on an ambient noise levels for the surrounding area. The AR system in these embodiments may measure, and/or receive from an external sensor, the ambient noise. This attenuation rate may be used to calculate maximum distances at which a primary user can be heard and can be understood.

The AR system in some embodiments present the primary user with an indicator of who can and cannot hear their voice. In some embodiments, the indicator may include a green or red icon superimposed over a nearby person's head to indicating whether or not that person should have been able to hear and/or understand the primary user. In some embodiments, the indicator may include a glowing circle superimposed on the ground or a glowing cylinder superimposed in the space indicating how far the primary user's voice is likely to be heard and/or understood. Some embodiments may use a microphone integrated into the AR system to detect a loudness of primary user's voice (e.g., in decibels).

Some embodiments may predict who are intended recipient(s) of a particular utterance from the primary user, and who may overhear hear it and be disturbed. Some embodiments may use a direction of the primary user's focus as input. The direction may be determined using a camera system integrated into the AR system. Some embodiments may also analyze the content of the utterance (e.g., names, commands, etc.) This analysis may utilize a historical knowledge corpus, which may be customized for the primary user using the analyzed content of their past utterances, social media contacts, facial recognition, etc.

Some embodiments may calculate a hearing profile for the intended recipient, customized for the specific locale, using the environmental parameters, the ambient noise profile, and a current distance between the two users. In some embodiments, this profile may further include modifiers for any equipment the intended recipient may be using, such as a hearing aid or hearing protection.

If the intended recipient is unlikely to have heard an utterance, then some embodiments may automatically use an electronic messaging capability of the AR system to transmit and/or re-transmit the primary user's utterance(s) to the predicted recipient(s). This may include dynamically initiating phone call, short wave radio broadcast, etc. between the primary user and intended recipient(s). Additionally or alternatively, some embodiments may transcribe the primary user's utterance(s) to a text format and then transmit that text to the intended recipients (e.g., as an SMS message or email). If the primary user is trying to speak with a group of people, with at least some present beyond the audible distance, then some embodiments may initiate group phone call or message to that subset of the group outside hearing range.

Some embodiments may continuously track the distance between the primary user and the intended recipients, and continuously monitor the local ambient noise and environmental parameters, to detect a change from audible to non-audible distances. In response, some embodiments may dynamically change the communication mode from an unassisted communication mode to an assisted communication mode (e.g., telephonic, SMS, etc.) and back to the unassisted communication mode.

Data Processing System

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of central processing units 110a-110d (generically, processor 110 or CPU 110) that may be connected to a main memory unit 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140 or a readable/writable optical disk drive 142. The network interfaces 118 may allow the DPS 100a to communicate with other DPS 100b over the network 106. The main memory 112 may also contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media 142 that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage devices 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interface units 114, 116, 118, 120 in some embodiments may support communication with a variety of storage and I/O devices. The mass storage interface unit 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 may be used to directly connect one or more display units 180 to the data processing system 100. These display units 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
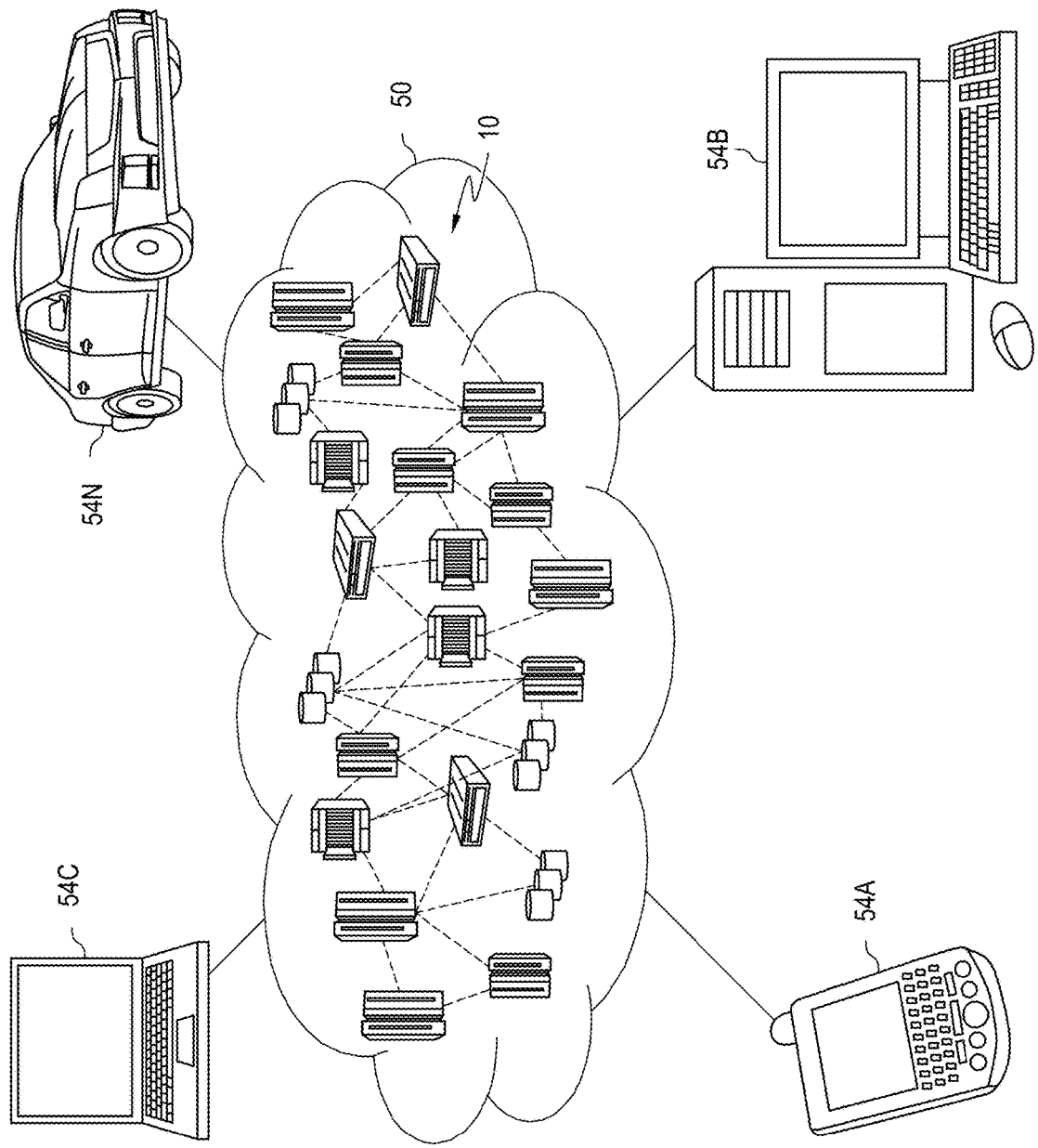
FIG. 2 depicts a cloud computing environment, consistent with some embodiments.

FIG. 2 illustrates one embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
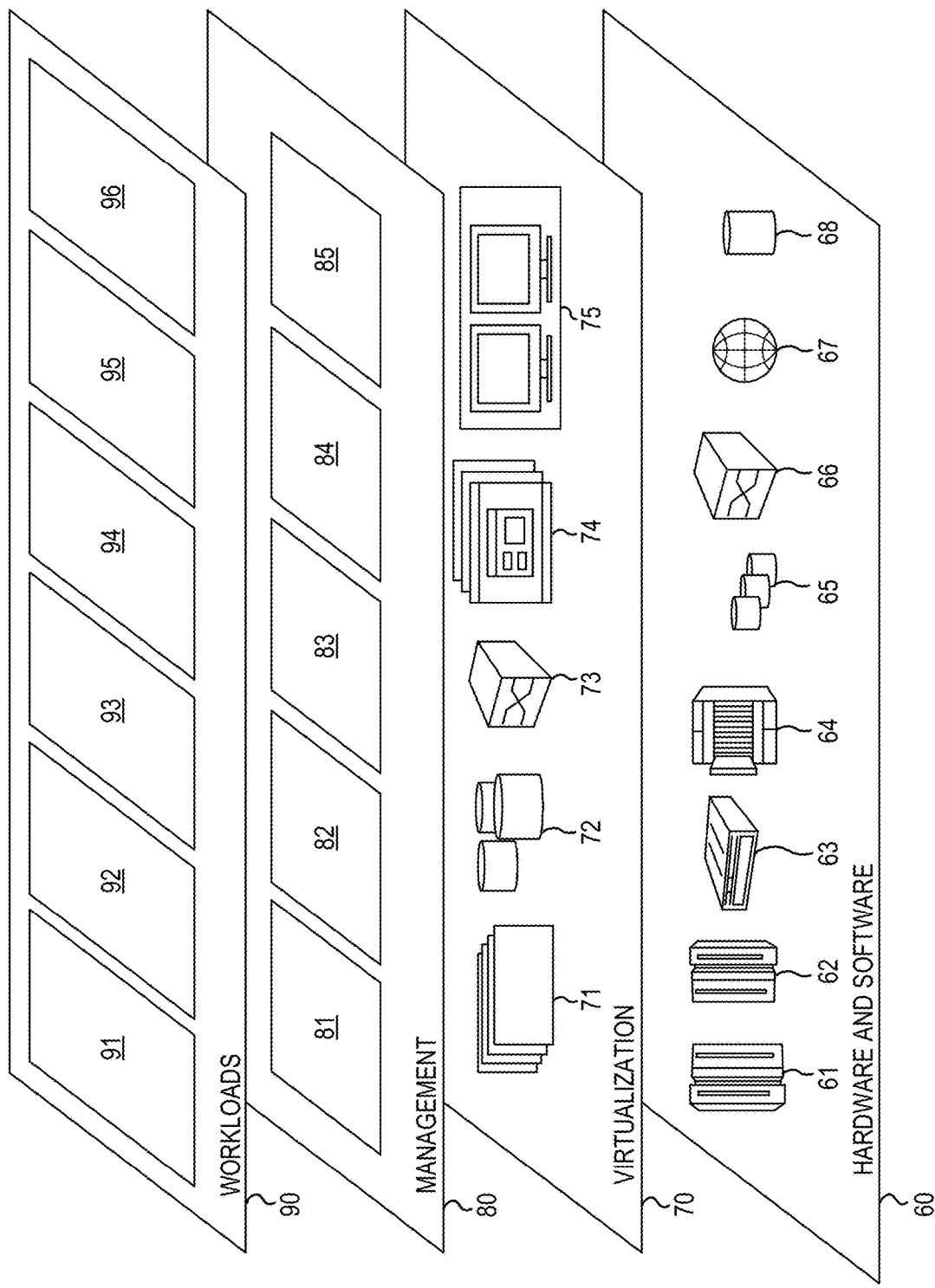
FIG. 3 depicts abstraction model layers, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recipient prediction module 96.

AR System

Figure 4:
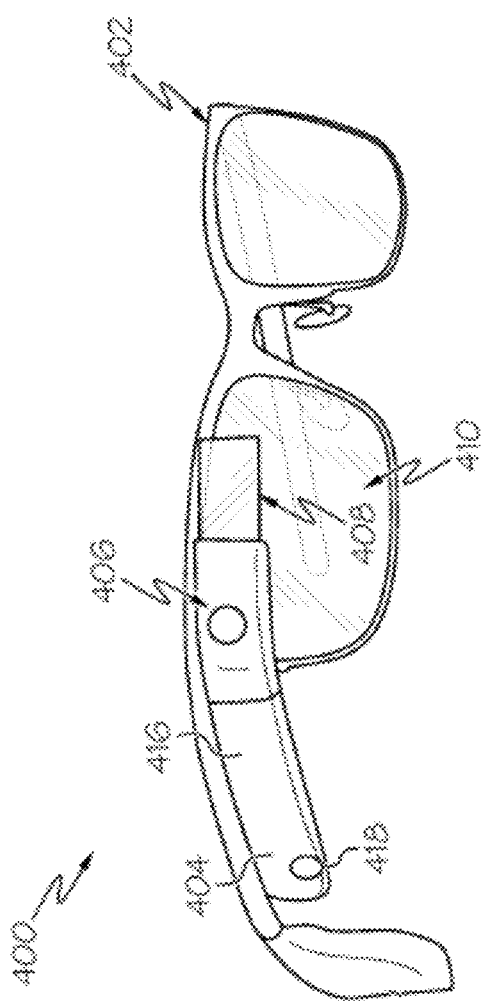
FIG. 4 is a perspective view of a head mounted display system with augmented-reality glass display ("AR system"), consistent with some embodiments.

FIG. 4 is a perspective view of head mounted display system with augmented-reality glass display ("AR system 400"), consistent with some embodiments. As shown, the AR system 400 may comprise a processor 416, a positioning device 404, a camera 406, a display 408, and a set of lenses 410 embedded into a wearable frame 402, which a primary user may wear like ordinary eyeglasses. The AR system 400 may also comprise a DPS 100a that performs some or all of the calculations on behalf of the processor 416.

The processor 403 and the positioning device 404 may cooperate to determine a physical location and field of view (based on directional orientation) of the primary user. For example, the positioning device 404 may include both a geographic locator (e.g., a global positioning system (GPS) device that utilizes signals from GPS satellites to determine the current position of the user/wearer) as well as orientation devices (e.g., accelerometers, 3-axis gravity detectors, etc.) that determine the direction that the user/wearer is looking ("field of view") while wearing the AR system 400.

The camera 406 may capture an image or video of the field of view of the primary user in the current locale. That is, the camera 406 may captures an electronic image of whatever the primary user is looking at while wearing the AR system 400. This image or video may be displayed on the display 408 along with augmentations.

The processor 403 may generate augmentations to overlay information onto the primary user's field of view. In one embodiment, this information may be overlaid onto the display 408, such that whatever the person is seeing through the lens 410 is augmented with the overlaid information.

The display 408 may be a small display device (e.g., a video screen such as a micro-LED display) that the wearer looks directly at, or it may be a projection device that displays images onto the lens 410. In one embodiment, the display 408 may present images/video from the camera 406 to the user/wearer of the AR system 400. In other embodiments, the display 408 may be semi-transparent such that the primary user can see the location through the display 408 as background to the augmentations.

As will be discussed in more detail with reference to FIGS. 5A-5B, 6, and 7A-7C, the processor 403 generates visual information related to the specific locale that the wearer is observing (i.e., are within his/her field of view). This visual information is then communicated by the display 408, which overlays the visual information onto the display 408.

Operational Environment

FIGS. 5A and 5B are diagrams illustrating environments 500a, 500b of the AR system 400 in operation, consistent with some embodiments of the disclosure and described with reference to the illustrative example of a conversation taking place between a primary user 510 of the AR system 400 and an intended recipient 530 at a locale 550 where social norms require relative silence, such as in a library. Also depicted are one or more other people 520 sharing the same locale 550, who may be disturbed if the primary user 510 speaks too loudly to the intended recipient 530.

In FIG. 5A, the AR system 400 may first detect that the primary user 510 is speaking. In response, the AR system 400 may prompt the user to identify the intended recipient(s) 530 and/or may predict one or more intended recipient(s)

530 to whom the primary user 510 is speaking. This may be based upon a direction the primary user is facing and/or the content of the utterance.

The AR system 400 may calculate two distances: (i) a shorter distance representing a maximum distance at which the primary user 510 can be clearly understood; and (ii) a longer distance representing a maximum distance at which the primary user 510 can be heard. As part of these calculations, the AR system may input a measured volume of the primary user's 510 voice; a measured volume of the ambient noise in the locale 550; estimated distances between the primary user 510, the intended recipient 530, and everyone else 520 at the locale 550; and one or more environmental factors to calculate a sound attenuation rate customized for the locale 550 using an appropriate physical model. Additionally, some embodiments may allow the primary user 510 to manually increase the respective distances for additional privacy protection, or manually decrease the respective distances ensure the primary user 510 will be heard (e.g., for safety related utterances).

The AR system 400 may use the calculated shorter distance to augment the user's field of view with a first graphical icon 525 (e.g., a green light vs. red light over the intended recipients' heads) indicating whether or not the that particular intended recipient should have been able to hear and understand the primary user's 510 utterance. Additionally, the AR system 400 may use the calculated longer distance to augment the user's field of view with a second graphical indicator 535 (e.g., a glowing circle) indicating how far the primary user's 510 voice is likely to be heard. The AR system 400 may use a third graphical indicator 545 (e.g., a glowing exclamation point) to indicate that that one of the other people 520 may be disturbed.

In FIG. 5A, if the AR system 400 determines that one of the intended recipients 530 is outside the calculated shorter distance, the AR system 400 may initiate its electronic messaging functionality to relay the primary user's voice to the intended recipient 530. In this way, the intended recipient can hear what the primary user is saying without that primary user having to increase their speaking volume to a level that would disturb the other people 520 in the locale 550.

In FIG. 5B, the AR system 400 may determine that the intended recipient 530 has subsequently moved closer to the primary user 510. In response, the AR system may terminate the electronic messaging functionality, and allow the primary user to speak unassisted to the intended recipient.

Figure 6:
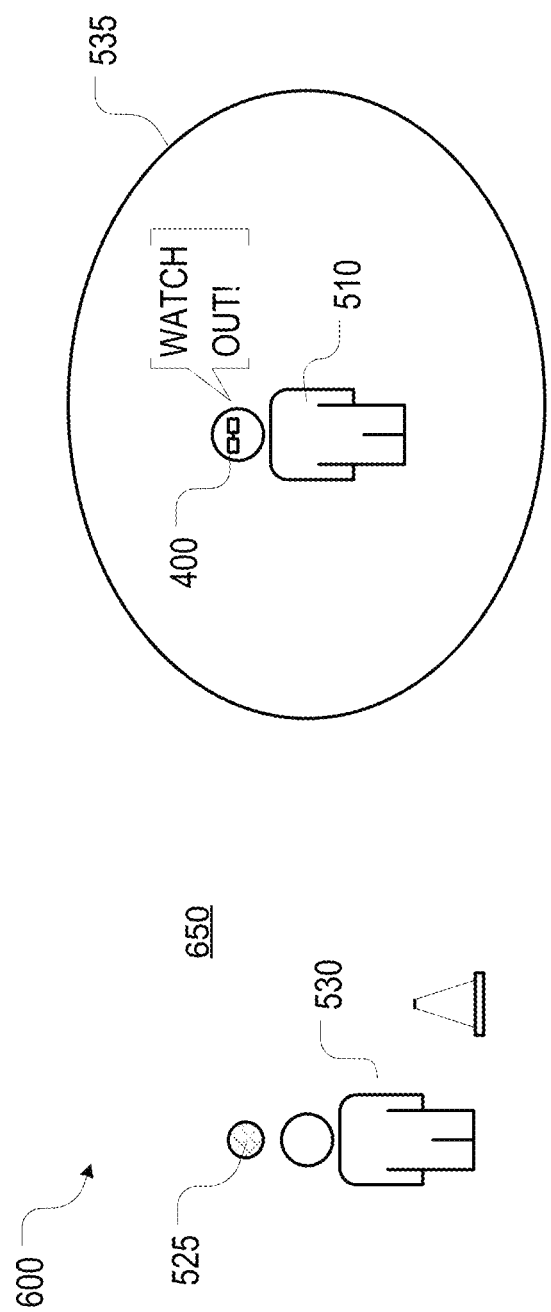
FIG. 6 is a diagram of the AR system in operation, consistent with some embodiments of the disclosure.

FIG. 6 is another diagram 600 of the AR system 400 in operation, consistent with some embodiments of the disclosure and described with reference to an illustrative example of a conversation taking place between the primary user 510 and the intended recipient 530 at a locale 650 at which there is a high level of ambient noise, such as a construction site. In this illustrative example, the primary user 510 may need to communicate important information, safety commands, etc. The AR system 400 in this illustrative example may calculate and present to the primary user 510 a graphical indicator that depicts who will be able to audibly hear an utterance. This graphical indicator may be in a different style or color than that described with reference to FIGS. 5A-5B.

If the AR system 400 determines that the intended recipient 530 is outside the calculated shorter distance, the system may automatically use electronic messaging to convey an utterance. Like the embodiment in FIGS. 5A-5B, the AR system 400 in FIG. 6 may dynamically switch from an unassisted mode to an assisted mode and back to the unassisted mode as the respective parties 510, 530 move around the locale 650.

Process Flow Diagram

Figure 7A:
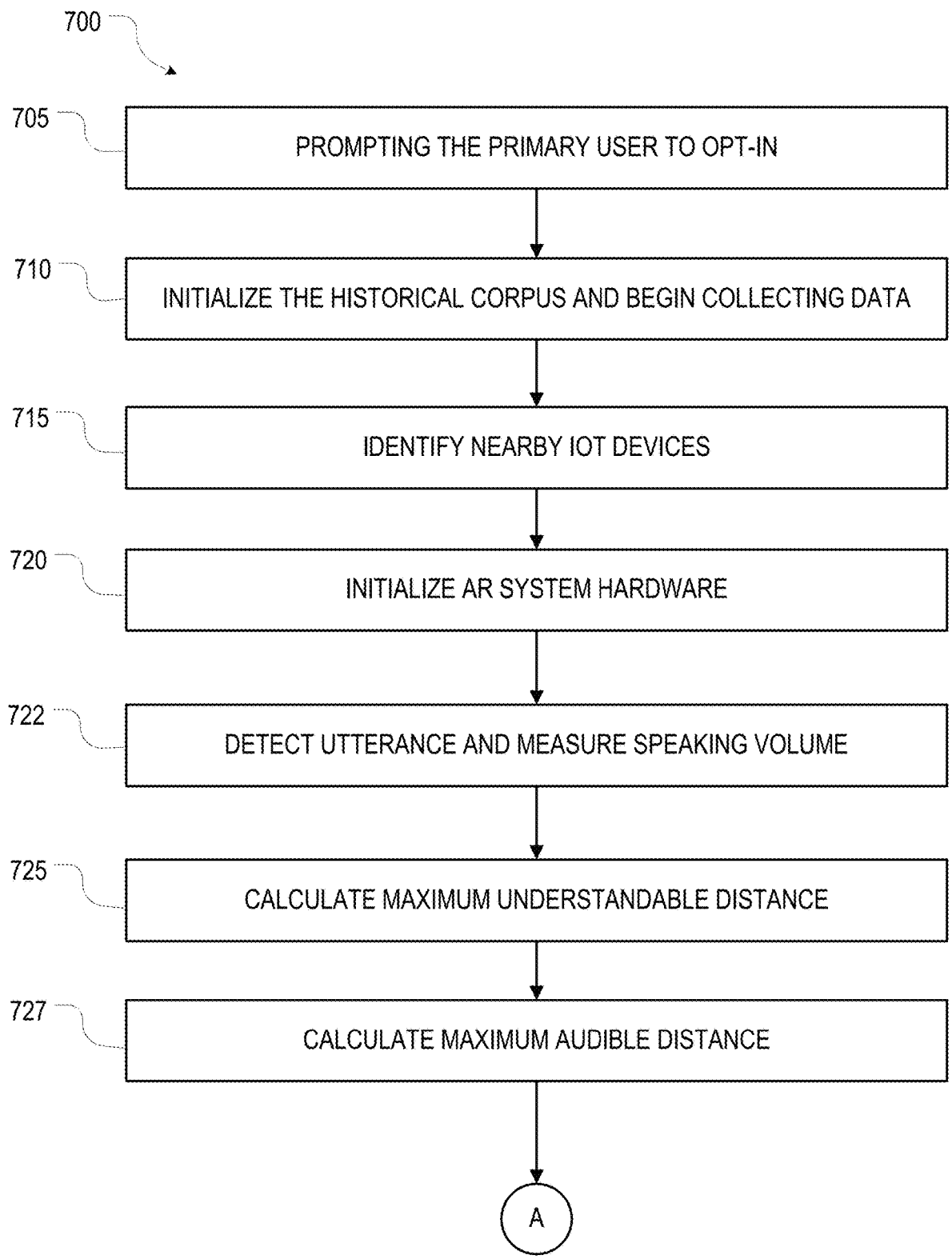
FIGS. 7A-7C are a process flow diagram, consistent with some embodiments of the disclosure.
Figure 7B:
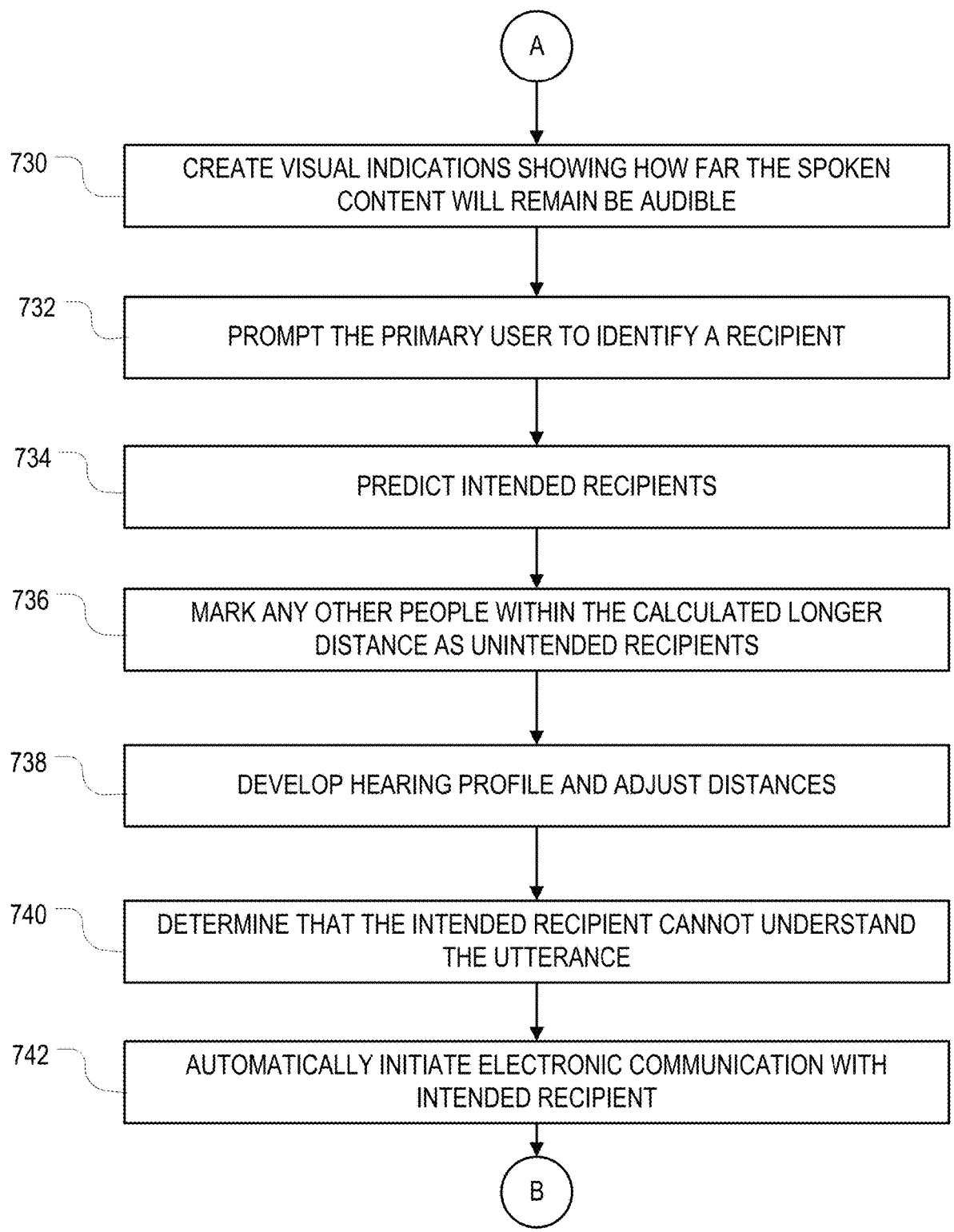
Figure 7C:
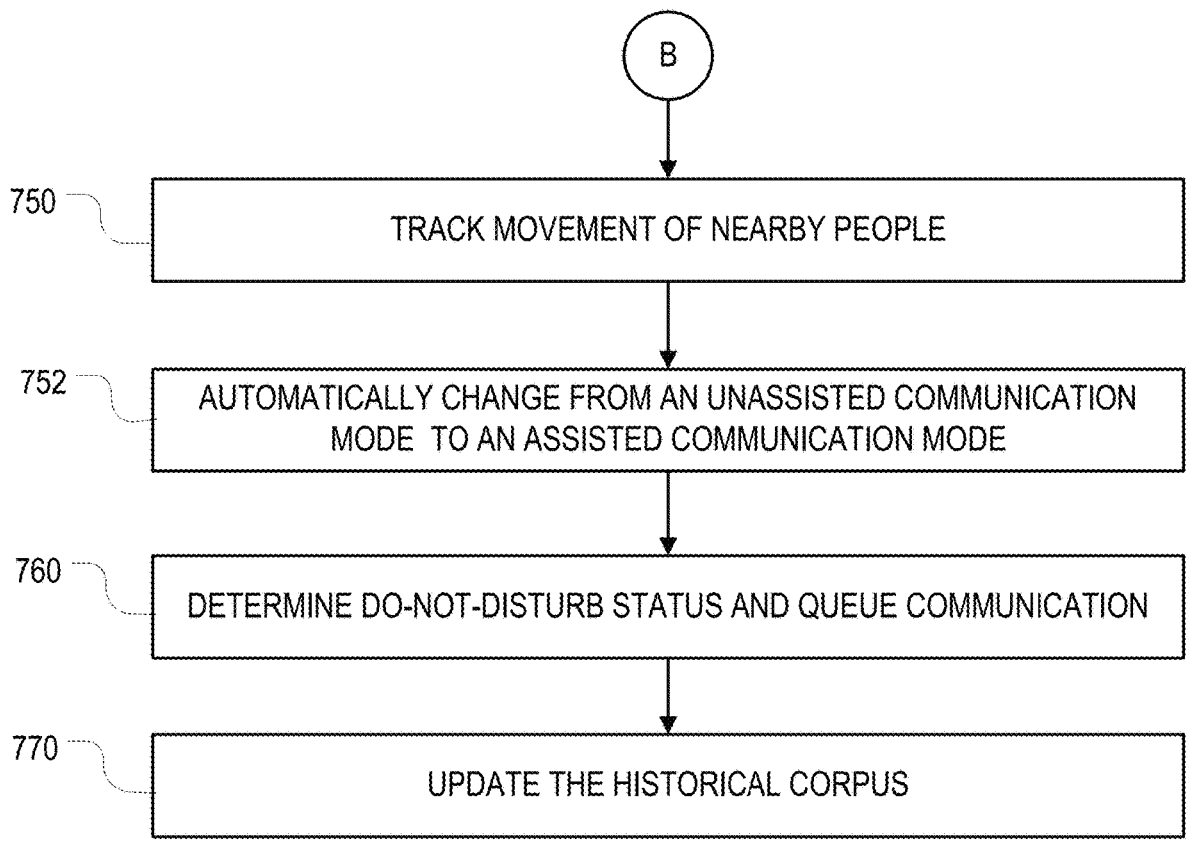

FIGS. 7A-7C are each parts of a process flow diagram 700, consistent with some embodiments of the disclosure. At operation 705, the AR system 400 may prompt the primary user 510 to opt-in to allowing recipient prediction and to allowing collection of a historical corpus. The historical corpus, in turn, may contain information to help identify who the intended recipients 530 are and what are the common interactions with those intended recipients 530. In some embodiments, boundary calculation and display may be implemented in software integrated into the AR system 400, while the optional recipient prediction and historical corpus features may be implemented on a DPS 100 operating in a cloud computing environment 50.

In response to an opt-in by the primary user 510, the AR system 400 may initialize the historical corpus and begin collecting data at operation 710. This may include a history of the primary user's conversations, identities of people nearby when those conversations took place, social media contacts, facial recognition information, etc. Additionally, if people 520, 530 nearby the primary user 510 have "Internet of Things" enabled devices (e.g., smart devices) on their persons, then those devices may be identified and used at operation 715 to better identify the intended recipients 530.

Next, the AR system 400 may initialize the hardware in the AR system 400 at operation 720. This may include determining whether or not that hardware includes a microphone, video camera, and/or remote messaging (e.g., telephonic) capability.

The primary user 510 may then begin to speak. In response, the AR system 400 may measure a volume of the utterance using the microphone at operation 722. The AR system 400 may then calculate (at operation 725) a first, shorter distance indicative of how far the utterance will remain understandable ("maximum understandable distance"), and calculate (at operation 727) a second, longer distance indicative of how far the utterance will remain audible ("maximum audible distance). In some embodiments, these two calculations may include identifying one or more environmental parameters, such as temperature, humidity, wind flow direction, etc. and then calculating how quickly the utterance will degrade versus distance using an appropriate physical model. In some embodiments, these two calculations may include measuring the ambient noise at the locale 550, 650, estimating to what extent that the ambient noise will interfere understanding the content of the utterance (e.g., similar frequencies, similar directions), and calculating how far the spoken content will be audible/understandable over that ambient noise.

At operations 730-738, the AR system 400 may display visual indications of who can and cannot hear and/or understand an utterance to the primary user 510 using the two calculated distances. This may include using the calculated longer distance to create a first visual indication (e.g., a semi-transparent boundary cylinder, a circular disk added onto the floor surface, hemisphere, etc.) to show how far the spoken content will remain be audible at operation 730. Some embodiments may use the calculated shorter distance to create a visual indication that may visually indicate how far the spoken content is likely to remain understandable. In some embodiments, this second visual indication may be gradated (e.g., in color and/or in intensity) to visually indicate the understandability level being reduced with distance as the volume dissipates.

At operation 732, the AR system 400 may prompt the user to identify a recipient and/or to indicate how loud the utterance should be at the recipient's 530 location. This information may be used to further augment primary user's 510 display with a visual indication (e.g., a red cross or blue check superimposed above their heads) above the intended recipient 530) with a prediction about whether that identified recipient 500 is likely to have understood the spoken content.

Additionally or alternatively, some embodiments may predict the intended recipients 530 at operation 734. While the primary user 510 is speaking, these embodiments may analyze the content the utterance (e.g., names used, and other factors derived from the corpus) and identify a direction of primary user's focus to predict the intended recipient(s) of the utterance.

The AR system 400 may then mark any other people within the calculated longer distance as unintended recipients at operation 736, and may visually indicate those unintended recipients with an appropriate augmentation (e.g., red exclamation mark superimposed above their heads). Additionally, some embodiments may validate what other people are performing the activities and will be showing who might get disturbed. For example, someone nearby is doing an activity that requires close attention and might get disturbed if by yelling, some embodiments may visually indicate that situation with an appropriate augmentation.

At operation 738, the AR system 400 may develop and/or receive a hearing profile for the intended recipient 530 and/or the other people 520 in the locale 550, 650, and then use those profiles to adjust the calculated distances. For example, one of the other people 520 in the area 550, 650 have their own AR system 400 or another IoT enabled device, then the sensors on one of those devices can be used to build out the recipients' hearing profiles, e.g., other people 520 and/or intended recipient 530. Alternatively, if the AR system 400 detects someone is wearing a hearing aid or hearing protection, then the AR system may increase or decrease the distances accordingly.

At operation 740, if the AR system 400 determines that a current position of the intended recipient 530 (predicted and/or indicated) is beyond the calculated shorter distance, then the AR system 400 may determine if that intended recipient 530 has their own AR system 400 or another compatible messaging system (e.g., a smart watch). In response to such a determination, the AR system 400 may automatically initiate electronic communication with that device at operation 742. In some embodiments, this may include automatically initiate a telephone call with the intended recipient 530, so no explicit action is required by the primary user 510. Moreover, if the AR system determines that a phone call will be too loud at either end, or if the AR system 400 determines that the ambient noise level in the locale 550, 650 will be too high, then the AR system 400 may automatically send a text message to the intended recipient's device.

At operation 750, the AR system 400 may continuously track the movement of everyone 510, 520, 530 in the locale 550, 650, and accordingly, determine when each enters or leaves one of the audible distances. Based on the determination, some embodiments may automatically change from an unassisted communication mode to an assisted communication mode (e.g., telephone, SMS), or from an assisted communication mode to an unassisted communication mode at operation 752.

At operation 760, if the AR system 400 determines that certain actions are being performed for which the primary user 510 or intended recipient 530 cannot be disturbed, then communication of those utterances may be queued for a later time. This may include observing user actions by the AR system 400 and passing those actions through a convolutional neural network (CNN) classification system or the like to identify what those actions. Additionally, actions that are deemed to be "Do Not Disturb" and within one of the audible boundaries may be indicated by a visual warning to the primary user 510.

At operation 770, some embodiments may update the historical corpus with a log of who the recipient(s) of various utterances were and a contextual analysis of those utterances.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for augmenting communication, comprising:
    calculating a sound boundary within which a communication can be heard, wherein the sound boundary represents a predicted maximum distance at which the communication can be understood;
    generating a visualization of the sound boundary on an augmented reality device; and
    presenting the visualization on the augmented reality device.

2. The method of claim 1, the method further comprising determining an intended recipient cannot understand the communication based on the sound boundary and a location of the intended recipient.

3. The method of claim 2, further comprising automatically electronically transmitting the communication to the intended recipient.

4. The method of claim 3, wherein automatically electronically transmitting the communication comprises relaying the communication over a cellular telephone network.

5. The method of claim 3, wherein automatically electronically transmitting the communication comprises generating a transcript of the communication and electronically transmitting the transcript.

6. The method of claim 2, further comprising predicting the intended recipient from among a plurality of people in a locale.

7. The method of claim 6, wherein the predicting of the intended recipient comprises determining a direction of attention of a user.

8. The method of claim 7, wherein the predicting of the intended recipient further comprises analyzing a content of the communication.

9. The method of claim 1, the method further comprising:
calculating a second sound boundary, wherein the second sound boundary represents a predicted maximum distance at which the communication can be heard; and the method further comprising determining that an unintended recipient may be able to hear the communication based on the sound boundary and a location of the unintended recipient.

10. The method of claim 9, further comprising generating a visualization on the augmented reality device that the unintended recipient can hear the communication.

11. The method of claim 1, wherein the calculating the sound boundary comprises measuring a volume level of a wearer of the augmented reality device.

12. The method of claim 11, wherein the calculating the sound boundary further comprises measuring a level of ambient noise in a locale.

13. The method of claim 12, wherein the calculating the sound boundary comprises calculating a sound intensity dissipation rate based on one or more environmental factors.

14. The method of claim 1, wherein the generating the visualization of the sound boundary comprises superimposing a graphical indication over a view of a location from a perspective of a user.

15. A computer program product for augmenting communication, the computer program product comprising a computer readable storage medium having program instructions embodied therewith, the program instructions executable by a processor to cause the processor to:
calculate a first sound boundary that represents a predicted maximum distance at which a communication can be understood;
calculate a second sound boundary that represents a predicted maximum distance at which the communication can be heard;
predict an intended recipient from among a plurality of people in a location, wherein the prediction includes:
determining a direction of the communication; and
analyzing content of the communication;
determine that the intended recipient cannot understand the communication based on the first sound boundary and a location of the intended recipient, and in response:
superimpose a graphical indication over a view of a locale from a perspective of a user indicating that the intended recipient cannot understand the communication; and
automatically electronically transmit the communication to the intended recipient; and
determine that an unintended recipient may be able to hear the communication based on the second sound boundary and a location of the unintended recipient, and in response, superimposing a graphical indication over a view of the locale from a perspective of a user indicating that the unintended recipient can hear the communication;
wherein calculating the first sound boundary and the second sound boundary comprises:
measuring a volume level of the communication;
measuring a level of ambient noise in the locale; and
calculating a sound attenuation rate based on one or more environmental factors at the locale.

16. An augmented reality system, comprising:
a wearable frame;
a processor coupled to the wearable frame, wherein the processor calculates a sound boundary relative to the wearable frame, within which a communication can be heard, wherein the sound boundary represents a predicted maximum distance at which the communication can be understood; and
a display coupled to the wearable frame, wherein the display overlays a visualization of the sound boundary onto a field of view of a user.

17. The system of claim 16, further comprising a positioning device for determining a physical location and the field of view of the user.

18. The system of claim 16, wherein:
the sound boundary represents a predicted maximum distance at which the communication can be understood; and
the processor determines that an intended recipient cannot understand the communication based on the sound boundary and a location of the intended recipient.

19. The system of claim 18, further comprising a wireless communication interface that automatically electronically transmits the communication to the intended recipient in response to determining that the intended recipient cannot understand the communication.

20. The system of claim 18, wherein:
the sound boundary represents a predicted maximum distance at which the communication can be heard;
the processor determines that an unintended recipient may be able to hear the communication based on the sound boundary and a location of the unintended recipient; and
the display further overlays a visualization that the unintended recipient can hear the communication.

\* \* \* \* \*